United States Patent
Kouda

(10) Patent No.: US 12,323,008 B2
(45) Date of Patent: Jun. 3, 2025

(54) ELECTRIC WORK MACHINE

(71) Applicant: MAKITA CORPORATION, Anjo (JP)

(72) Inventor: Kei Kouda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 308 days.

(21) Appl. No.: 17/968,845

(22) Filed: Oct. 19, 2022

(65) Prior Publication Data

US 2023/0179048 A1 Jun. 8, 2023

(30) Foreign Application Priority Data

Dec. 2, 2021 (JP) ................................. 2021-196448

(51) Int. Cl.
| H02K 7/08 | (2006.01) |
| H02K 1/30 | (2006.01) |
| H02K 7/04 | (2006.01) |
| H02K 7/14 | (2006.01) |
| H02K 9/06 | (2006.01) |
| B25B 21/02 | (2006.01) |
| B25F 5/00 | (2006.01) |

(52) U.S. Cl.
CPC ................. *H02K 1/30* (2013.01); *H02K 7/04* (2013.01); *H02K 7/083* (2013.01); *H02K 7/145* (2013.01); *H02K 9/06* (2013.01); *B25B 21/02* (2013.01); *B25F 5/008* (2013.01)

(58) Field of Classification Search
CPC ............ H02K 1/30; H02K 7/04; H02K 7/083; H02K 7/145; H02K 9/06; H02K 1/276; H02K 1/278; H02K 5/161; B25B 21/02; B25F 5/008
See application file for complete search history.

(56) References Cited

U.S. PATENT DOCUMENTS

| 2017/0187258 A1* | 6/2017 | Fujikawa | H02K 1/2791 |
| 2018/0358854 A1* | 12/2018 | Inuzuka | H02K 1/276 |
| 2021/0091640 A1* | 3/2021 | Aoyama | H02K 7/145 |
| 2021/0194319 A1 | 6/2021 | Smith et al. | |
| 2022/0393559 A1* | 12/2022 | Zheng | H02K 29/00 |
| 2023/0137688 A1* | 5/2023 | Takizawa | H02K 1/278 310/156.01 |

FOREIGN PATENT DOCUMENTS

JP 2020162367 A * 10/2020

* cited by examiner

*Primary Examiner* — Thomas Truong
(74) *Attorney, Agent, or Firm* — Oliff PLC

(57) ABSTRACT

An electric work machine includes a brushless motor shortened in the direction of a motor shaft and allowing the rotational balance of a rotor to be easily adjustable. The electric work machine includes a brushless motor including a stator and a rotor, and at least one motor bearing supporting the rotor in a rotatable manner. The rotor includes a magnet being cylindrical and a magnet holder being hollow cylindrical or solid cylindrical. The magnet holder has a recess recessed in an axial direction, holds the magnet with the magnet being exposed in a radial direction, and has an axial length longer than the magnet. The magnet holder is partially exposed. The at least one motor bearing is at least partially received in the recess.

12 Claims, 12 Drawing Sheets

ELECTRIC WORK MACHINE

CROSS-REFERENCE TO RELATED APPLICATIONS

This application claims the benefit of priority to Japanese Patent Application No. 2021-196448, filed on Dec. 2, 2021, the entire contents of which are hereby incorporated by reference.

BACKGROUND

1. Technical Field

The present disclosure relates to an electric work machine including a power tool such as an impact driver, a gardening tool such as a lawn mower, an air compressor for an air tool, and a transport vehicle.

2. Description of the Background

An impact driver using a brushless motor as a drive source is described in U.S. Patent Application Publication No. 2021/0194319.

BRIEF SUMMARY

An electric work machine such as an impact driver may include a brushless motor that is expected to be shortened in the direction of a motor shaft and to allow the rotational balance of a rotor to be easily adjustable.

A first aspect of the present disclosure provides an electric work machine, including:
a brushless motor including
  a stator, and
  a rotor including
    a magnet being cylindrical, and
    a magnet holder being hollow cylindrical or solid cylindrical, the magnet holder having a recess recessed in an axial direction, the magnet holder holding the magnet with the magnet being exposed in a radial direction, the magnet holder having an axial length longer than the magnet and being partially exposed; and
at least one motor bearing supporting the rotor in a rotatable manner, the at least one motor bearing being at least partially received in the recess.

A second aspect of the present disclosure provides an electric work machine, including:
a brushless motor including
  a stator, and
  a rotor including
    a plurality of magnets being plates,
    a magnet holder being cylindrical and holding the plurality of magnets without exposing the plurality of magnets in a radial direction, and
    a core holder being hollow cylindrical or solid cylindrical, the core holder having a recess recessed in an axial direction, the core holder holding the magnet holder with the magnet holder being exposed in a radial direction, the core holder having an axial length longer than the magnet holder and the plurality of magnets, the core holder being partially exposed; and
at least one motor bearing supporting the rotor in a rotatable manner, the at least one motor bearing being at least partially received in the recess.

The core holder may include an inner ring holder holding an inner ring in the at least one motor bearing.

The at least one motor bearing may include two motor bearings located across the core holder in the axial direction.

The inner ring holder may be located in each of the two motor bearings, and the inner ring holder in one of the two motor bearings and the inner ring holder in another of the two motor bearings may have shapes similar to each other.

The rotor may include a motor shaft supported by the at least one motor bearing in a rotatable manner.

The motor shaft may be integral with the core holder.

The rotor may include a motor shaft supported by the at least one motor bearing in a rotatable manner.

The motor shaft may be separate from the core holder.

The electric work machine may further include a housing holding the at least one motor bearing.

The housing holding the at least one motor bearing may be at least partially received in the recess.

A third aspect of the present disclosure provides an electric work machine, including:
a brushless motor including
  a stator, and
  a rotor including
    at least one balance adjuster being cylindrical and having a recess recessed in an axial direction, the at least one balance adjuster being partially exposed;
a motor bearing supporting the rotor in a rotatable manner, the motor bearing being at least partially received in the recess; and
a fan fixed to the at least one balance adjuster.

The electric work machine according to the above aspects of the present disclosure includes the brushless motor shortened in the direction of the motor shaft and allowing the rotational balance of the rotor to easily adjustable.

DETAILED DESCRIPTION

Embodiments (including modifications) of the present disclosure are described with reference to the drawings as appropriate. The present disclosure is not limited to the embodiments and the modifications.

The directional terms such as front, rear, up, down, right, and left in the embodiments and the modifications are defined for ease of explanation, and may be changed depending on, for example, at least the operating situations or the movement of a component.

First Embodiment

Figure 1:
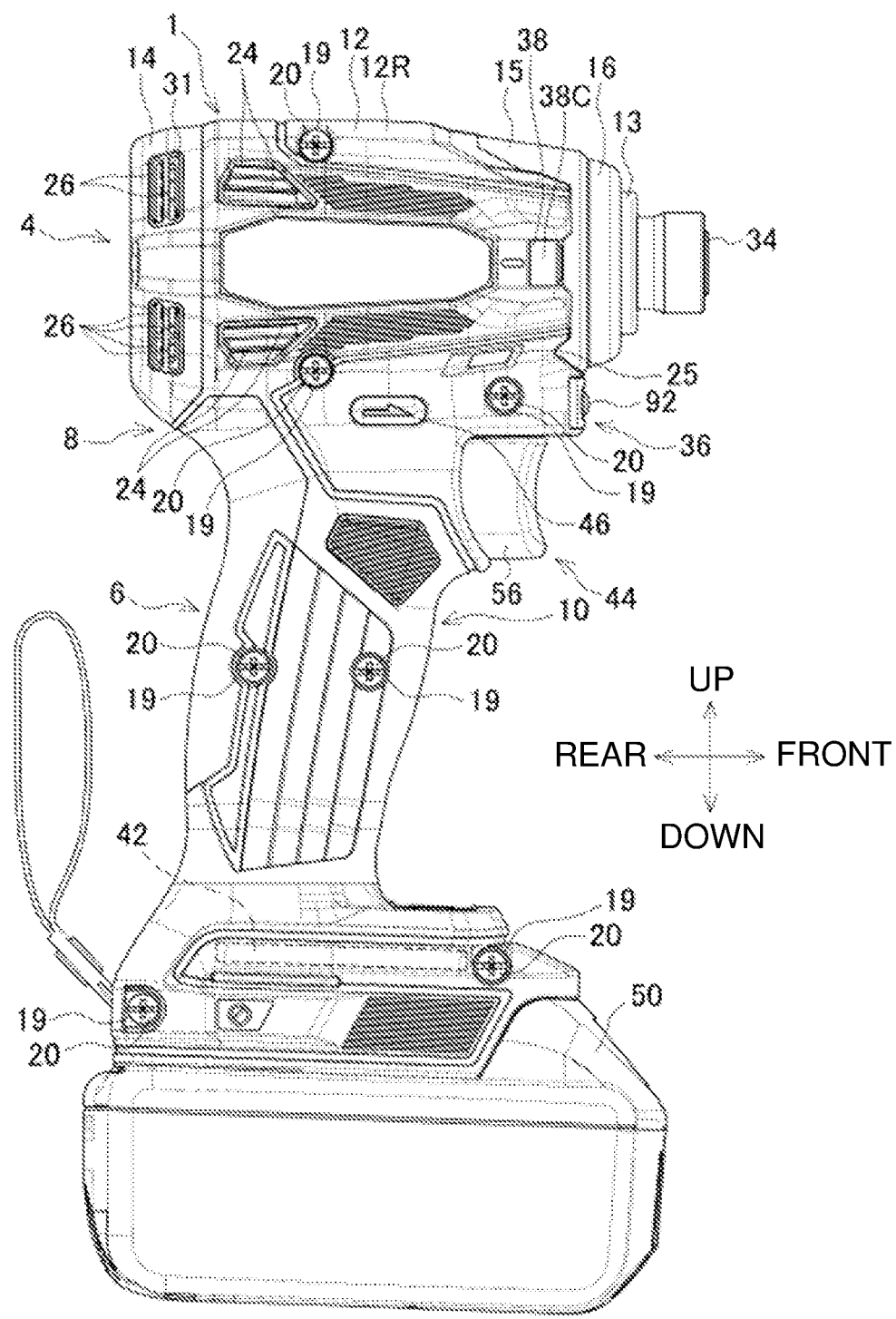
FIG. 1 is a right side view of an impact driver according to a first embodiment.
Figure 2:
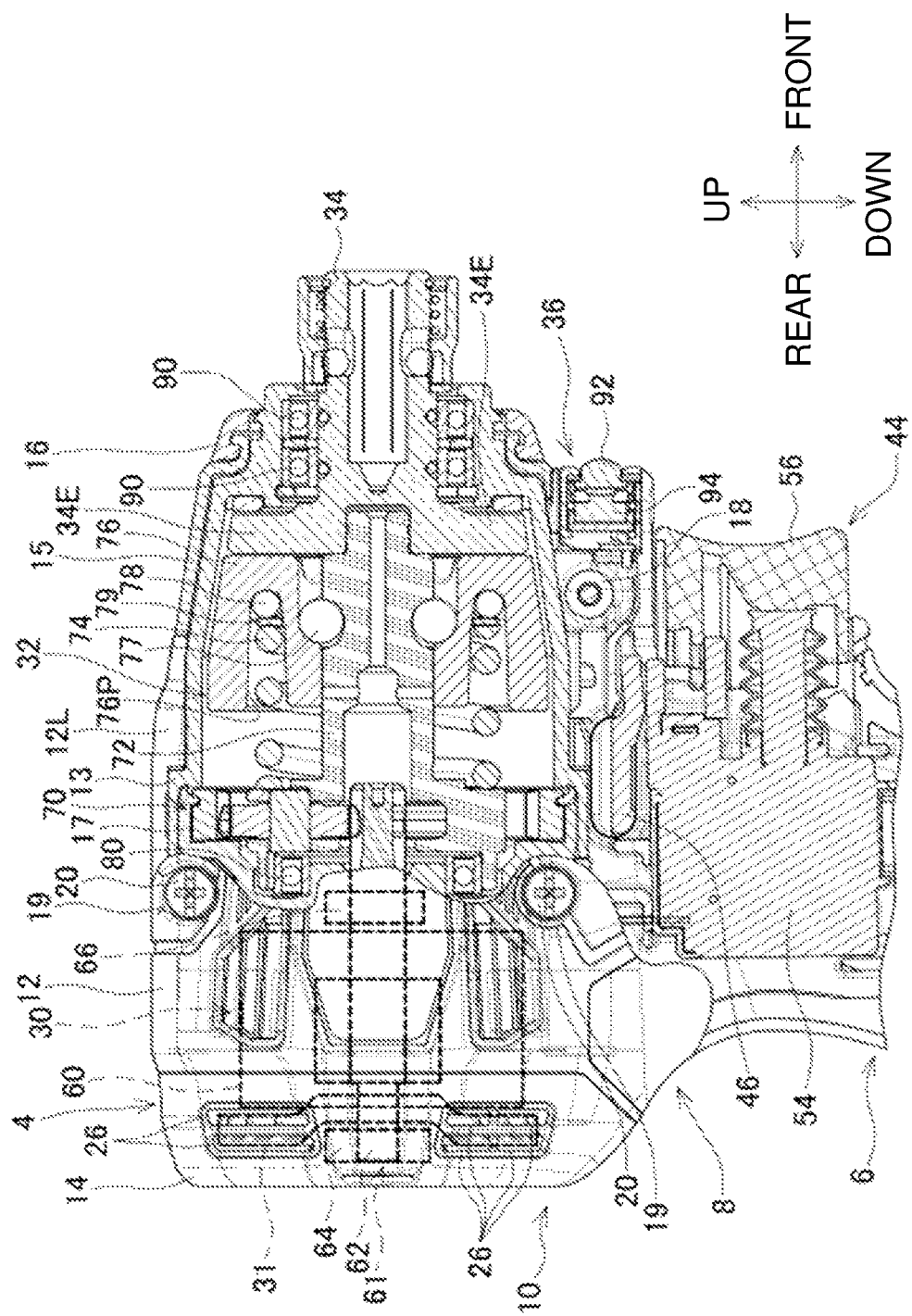
FIG. 2 is a longitudinal central sectional view of the upper part of FIG. 1.

An electric work machine according to a first embodiment of the present disclosure is an impact tool. FIG. 1 is a right side view of an impact driver 1 that is an example of a handheld screwing machine. FIG. 2 is a longitudinal central sectional view of the upper part of FIG. 1.

The impact driver 1 includes a head 4 and a grip 6.

The head 4 is cylindrical and has a central axis extending in the front-rear direction.

The grip 6 is cylindrical. The grip 6 protrudes downward from a lower portion of the head 4. A user holds the grip 6. The grip 6 is connected to a lower rear portion of the head 4. A joint 8 connecting the head 4 and the grip 6 extends from the upper end of the grip 6 to the lower end of the head 4.

An outer wall of the head 4 and an outer wall of the grip 6 define a housing 10.

The housing 10 holds various components directly or indirectly.

The housing 10 includes a motor housing 12, a hammer case 13, a rear lid 14, a hammer case cover 15, a bumper 16, and a gear case 17.

The motor housing 12 is formed from a plastic. The motor housing 12 is halved into a left motor housing 12L and a right motor housing 12R.

The left motor housing 12L includes multiple screw bosses 18. The right motor housing 12R has multiple threaded holes 19. Each threaded hole 19 has a threaded hole corresponding to the screw boss 18. The left motor housing 12L and the right motor housing 12R are joined together with screws 20 that are placed in the threaded holes 19 and the screw bosses 18.

The motor housing 12 extends from a rear portion of the head 4 to the grip 6. The motor housing 12 has openings at the lower end of the grip 6, and at the front end and the rear end of the rear portion of the head 4.

Multiple first inlets 24 are located on both sides of the rear portion the outer wall of the head 4. Each first inlet 24 is elongated in the front-rear direction. The head 4 has two upper and lower first inlets 24 on its upper right side and two upper and lower first inlets 24 on its lower right side. The head 4 has two upper and lower first inlets 24 on its upper left side and two upper and lower first inlets 24 on its lower left side.

Second inlets 25 are located on both sides of a lower front portion of the outer wall of the head 4. Each second inlet 25 is elongated in the front-rear direction.

The hammer case 13 is formed from a metal. The hammer case 13 is cylindrical. The hammer case 13 is open in the front-rear direction.

The hammer case 13 is bell-shaped, with its front portion having a smaller diameter than its rear portion. The hammer case 13 defines a front outer wall of the head 4. The hammer case 13 includes its rear portion received in an upper opening of the motor housing 12.

The hammer case 13 has its outer wall located inward from the second inlets 25 in the motor housing 12.

The rear lid 14 is formed from a plastic. The rear lid 14 is dish-shaped. The rear lid 14 extends vertically and laterally. The front end of the rear lid 14 is open frontward.

The rear lid 14 covers an opening at the rear end of the head 4. The rear lid 14 is located at the rear end of the head 4.

The rear lid 14 has multiple (two) outlets 26 in each of upper right and upper left portions (four in total). The rear lid 14 has multiple (four) outlets 26 in each of lower right and lower left portions (eight in total). Each outlet 26 is elongated vertically. Each outlet 26 extends circumferentially.

The hammer case cover 15 is formed from a plastic and is cylindrical.

The hammer case cover 15 is located outside a middle portion of the hammer case 13 in the front-rear direction.

The bumper 16 is elastic. The bumper 16 is annular.

The bumper 16 is located outside the front end of the hammer case 13.

The gear case 17 is formed from a metal. The gear case 17 is dish-shaped. The gear case 17 extends vertically and laterally. The gear case 17 is open frontward. The gear case 17 has, in its middle portion in the vertical and lateral directions, a hole extending in the front-rear direction.

The gear case 17 has its front portion received in the rear end of the hammer case 13. The gear case 17 has its rear portion held by the motor housing 12.

The housing 10 can be modified in various ways. For example, the outer wall of the head 4 and the outer wall of the grip 6 may be separate and may be joined to each other. The left motor housing 12L and the right motor housing 12R may be largely different from each other in at least one of the size or the shape. The left motor housing 12L and the right motor housing 12R may be joined with fasteners other than the screws 20 (an engaging portion such as a tab and a receiving portion such as a tab hole). The hammer case 13 may be halved, or at least one of the hammer case cover 15 or the bumper 16 may be eliminated. The materials of various portions in the housing 10 may be modified. At least one of the number or the arrangement of the first inlets 24 may be modified as appropriate. At least one of the number or the arrangement of the second inlets 25 may be modified as appropriate. At least one of the number or the arrangement of the outlets 26 may be modified as appropriate.

The head 4 includes an upper portion of the housing 10, a motor 30, a fan 31, a power transmitter 32, an anvil 34 (output unit), an upper operation unit 36, and multiple (two) lamps 38.

The fan 31, the motor 30, the power transmitter 32, and the anvil 34 are located in this order from the rear in the head 4.

The grip 6 includes a lower portion of the housing 10, a battery mount 40, a controller 42, a main switch 44, and a forward-reverse switch lever 46.

The forward-reverse switch lever 46 may be included in the head 4.

The battery mount 40 is located at the lower end of the grip 6. The battery mount 40 extends in the front-rear and lateral directions relative to a portion located above the battery mount 40.

The battery mount 40 receives a battery 50.

The battery 50 is mounted on the underside of the battery mount 40. The battery 50 is slid from the front to the rear of the battery mount 40 to be mounted. The sliding direction of the battery 50 for attachment may be in a direction other than from the front to the rear. The battery 50 may be mounted in a manner other than attachment by sliding.

The battery 50 is a lithium-ion battery of 18 volts (V). The battery 50 includes eight cells (not shown) in a plastic battery case. The cells are axially elongated cylinders, and face in the lateral direction in the attached battery 50. The battery 50 stores power to drive the motor 30.

Any lithium-ion battery with a voltage of 10.8 V, 14.4 V, 25.2 V, 28 V, or 36 V may be used as the battery 50. Any lithium-ion battery with a voltage of less than 10.8 V or more than 36 V may be used as the battery 50. A battery of another type may be used as the battery 50. Multiple batteries 50 may be used.

The controller 42 is held inside the battery mount 40.

The controller 42 controls the motor 30.

Multiple buttons (not shown) and a display (not shown) are electrically connected to the controller 42. The buttons and the display are located in an upper portion of the battery mount 40. The controller 42 controls the buttons and the display. An operation on a single button can set at least one of the impact mode associated with the type of striking or the degree of impact. The display can show, for example, various settings and the remaining battery level of the battery 50.

The main switch 44 is located at the upper end of the grip 6.

The main switch 44 includes a switch body 54 and a trigger 56.

The main switch 44 is located with a front portion of the trigger 56 exposed.

The trigger 56 is located in front of the switch body 54.

When the user operates the trigger 56 to move backward, the switch body 54 is turned on after a predetermined play is used, and the main switch 44 is turned on. When the trigger 56 is operated to move further backward, a signal transmitted from the switch body 54 changes in accordance with the amount of movement resulting from the backward operation.

No play may be provided, and the main switch 44 may be turned on upon a backward operation on the trigger 56.

The forward-reverse switch lever 46 is located between the trigger 56 and the hammer case 13.

The forward-reverse switch lever 46 passes through the joint 8 between the head 4 and the grip 6 in the lateral direction.

Pushing the forward-reverse switch lever 46 leftward or rightward switches the rotation direction of the motor 30 (between forward and backward).

The motor 30 in the head 4 is a direct current (DC) brushless motor.

The motor 30 includes a stator 60 and a rotor 61. The rear lid 14 is fastened to the stator 60 with screws (not shown) extending in the front-rear direction.

The stator 60 is cylindrical. The stator 60 includes a stator core (not shown), an insulator (not shown), and multiple coils (not shown). The stator core is cylindrical. The stator core includes multiple teeth on the inner surface. Each tooth extends in the radial direction. As many coils as the teeth are wound around the respective teeth with the insulator in between.

The rotor 61 has its center located radially inward from the stator 60. The motor 30 is an inner-rotor motor.

The rotor 61 includes a motor shaft 62. The motor shaft 62 is cylindrical and extends in the front-rear direction. The rotor 61 rotates about the central axis of the motor shaft 62. The motor shaft 62 includes, at its distal end, a gear portion having multiple teeth. The motor 30 is a drive for the impact driver 1. The motor shaft 62 may include the gear portion separate from the other portions.

The motor shaft 62 is supported by a rear motor bearing 64 and a front motor bearing 66 in a rotatable manner.

The rear motor bearing 64 supports the rear end of the motor shaft 62 in a rotatable manner. The rear motor bearing 64 is held by the rear lid 14. The rear motor bearing 64 is located behind the fan 31.

The front motor bearing 66 supports the front end of the motor shaft 62 in a rotatable manner. The front motor bearing 66 is held by the gear case 17.

The fan 31 is fixed integrally with the motor shaft 62.

The fan 31 is a centrifugal fan. The fan 31 may be any other fan such as an axial flow fan.

The outlets 26 in the rear lid 14 are located radially outward from the fan 31.

The power transmitter 32 includes a planetary gear assembly 70 (reducer), a spindle 72, a spring 74 (elastic member), a hammer 76, hammer balls 77, multiple spring balls 78, and a hammer washer 79.

The rotation of the rotor 61 is transmitted to the spindle 72. The power transmitter 32 converts the rotational force of the spindle 72 to a rotational impact force as appropriate for transmission to the anvil 34. The anvil 34 is rotatable around an axis extending in the front-rear direction under the rotational impact force. The anvil 34 (tip tool holder) holds a bit (tip tool, not shown). The bit is, for example, a driver. The impact driver 1 can be used for tightening screws.

The planetary gear assembly 70 is located between the distal end of the motor shaft 62 and the spindle 72.

The planetary gear assembly 70 reduces the rotation of the motor shaft 62 and transmits the rotation to the spindle 72.

The planetary gear assembly 70 has an outer wall defining the gear case 17.

The spindle 72 is cylindrical. The spindle 72 extends in the front-rear direction.

The spindle 72 is supported by a spindle bearing 80 in a manner rotatable about its central axis. The spindle bearing 80 is located behind the planetary gear assembly 70. The spindle bearing 80 is held by the gear case 17. The front motor bearing 66 includes an outer ring located radially inward from an inner ring in the spindle bearing 80.

The distal end of the motor shaft 62 is received in an inner hole of the spindle 72.

The spring 74 is a coil formed from a metal.

The hammer 76 is formed from a metal and is cylindrical with its axis extending in the front-rear direction. The spindle 72 has a front portion received in a center hole of the hammer 76. The hammer balls 77 are located between the hammer 76 and the spindle 72. Each hammer ball 77 guides the hammer 76 mainly in the front-rear direction during striking.

The hammer 76 has a cylindrical recess 76P recessed frontward from the rear surface. The recess 76P receives a front portion of the spring 74. The front end of the spring 74 is annular and is located at the bottom (front end) of the recess 76P with the multiple spring balls 78 and the hammer washer 79 located between the bottom of the recess 76P and the front end of the spring 74.

The anvil 34 in front of the hammer 76 is cylindrical and extends in the front-rear direction. The anvil 34 is supported by multiple (two) anvil bearings 90 in a manner rotatable about its central axis. The anvil bearings 90 are held in an opening at the front end of the hammer case 13. The anvil bearings 90 are arranged in the front-rear direction.

The anvil 34 includes, at its rear, multiple (a pair of) extensions 34E. Each extension 34E extends in the radial direction. The extensions 34E are located behind the anvil bearings 90.

The anvil 34 receives the front end of the spindle 72 at the center of its rear end. The rotation of the spindle 72 is transmitted to the anvil 34 through the hammer 76. The hammer 76 buffered by the spring 74 as appropriate transmits the rotation of the spindle 72 to the anvil 34. The spring 74 is located between the spindle 72 and the hammer 76. The hammer 76 strikes the anvil 34 by repeatedly hitting the extensions 34E in accordance with the set impact mode and the set degree of impact. The power transmitter 32 transmits power mainly in the rotation direction with its axis in the front-rear direction.

The anvil 34 receives a bit (not shown) in its front portion. The bit is attached to the anvil 34 in a detachable manner.

The upper operation unit 36 is located below the head 4, above the trigger 56, and in front of the forward-reverse switch lever 46.

The upper operation unit 36 includes an operation unit 92 and a transmitter 94.

The operation unit 92 is a button operable by the user to move backward. The operation unit 92 may be a switch other than a button.

The transmitter 94 transmits signals for switching, for example, the states of the components in response to an operation on the operation unit 92.

The upper operation unit 36 is located in a holder in a lower portion of the front end of the head 4, with a front portion of the operation unit 92 exposed.

The operation unit 92 is located outside (below) the hammer case 13.

The upper operation unit 36 is electrically connected to the controller 42 with a lead wire (not shown). The controller 42 receives signals from the transmitter 94.

The lamps 38 are located on the front right and the front left of the head 4 (FIG. 1).

Each lamp 38 includes a light-emitting diode (LED, not shown) as a lamp and a lamp case 38C as a case.

The lamps 38 are held by the motor housing 12.

The lamps 38 are electrically connected to the controller 42 with lead wires (not shown). The controller 42 controls the lamps 38.

When turned on, the lamps 38 emit light frontward, illuminating ahead of the anvil 34.

The lamps may be other than LEDs. The lamp 38 may be either on the right or left, or may be located in, for example, an upper portion of the head 4 instead of or in addition to the right and left. A single lamp 38 or three or more lamps 38 may be located.

Figure 3:
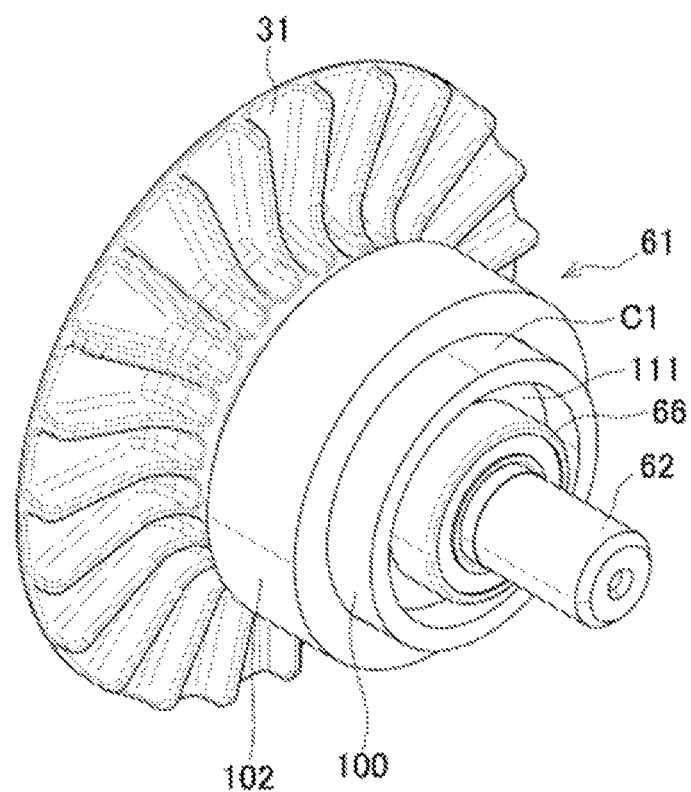
FIG. 3 is a perspective view of a rotor, a fan, a rear motor bearing, and a front motor bearing in FIG. 2.
Figure 4A:
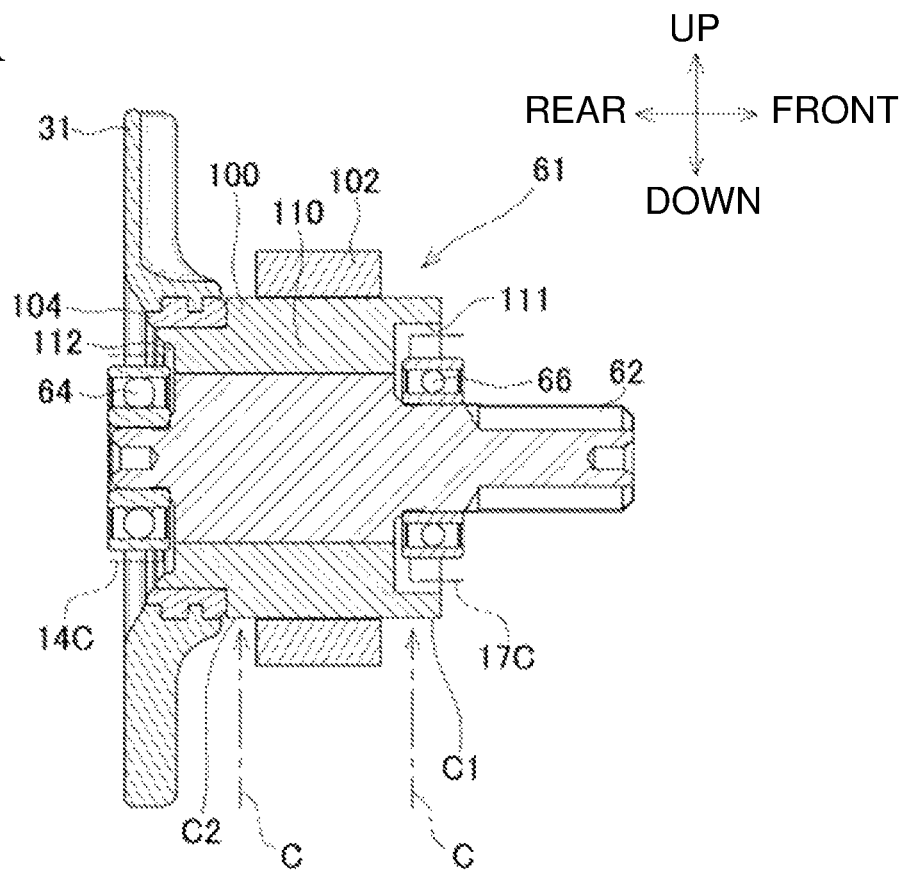
FIG. 4A is a longitudinal central sectional view of FIG. 3.

FIG. 3 is a perspective view of the rotor 61, the fan 31, the rear motor bearing 64, and the front motor bearing 66 as viewed from the upper right front. FIG. 4A is a longitudinal central sectional view of FIG. 3.

The rotor 61 includes the motor shaft 62, a magnet holder 100, and a magnet 102.

The magnet holder 100 is cylindrical. The magnet holder 100 is formed from a nonmagnetic material at least selected from stainless steel, brass, a brass alloy, aluminum, or an aluminum alloy. The magnet holder 100 may be, for example, a regular polygonal prism.

The magnet holder 100 is fixed to the motor shaft 62. The magnet holder 100 is located radially outward from the motor shaft 62. The magnet holder 100 extends from the middle to the rear end of the motor shaft 62 in the front-rear direction. The magnet holder 100 is a part of the rotor 61. However, the magnet holder 100 is a component separate from the motor shaft 62 before the magnet holder 100 is fixed.

The fan 31 is fixed to the rear end of the magnet holder 100 with a fan bushing 104. The fan bushing 104 may be a component of the fan 31 or may be a component of the rotor 61.

The magnet holder 100 includes a magnet holder body 110, a front recess 111, and a rear recess 112.

The rear motor bearing 64 and the front motor bearing 66 are located across the magnet holder 100 in the axial direction (front-rear direction).

The magnet holder body 110 is cylindrical.

The magnet holder body 110 may be, for example, a regular polygonal prism.

The front recess 111 is located at the front end of the magnet holder 100. The front recess 111 is located on the front surface of the magnet holder body 110 to surround an inner hole of the magnet holder body 110. The front recess 111 is recessed rearward relative to its radially outer portion. The radially inner edge of the front recess 111 extends to the inner hole (a portion adjacent to the motor shaft 62) of the magnet holder body 110. The front recess 111 has its central axis extending in the front-rear direction and aligned with the central axis of the motor shaft 62.

The front recess 111 has a larger outer diameter than the front motor bearing 66. The outer ring in the front motor bearing 66 is not in contact with the magnet holder 100 but is in contact with the gear case 17.

The front motor bearing 66 is at least partially received in the front recess 111. The front motor bearing 66 overlaps the front recess 111 as viewed from outside in the circumferential direction. The front motor bearing 66 has its rear end located rearward from the front end of the front recess 111. This shortens the rotor 61 and its peripheral components in the front-rear direction.

As shown in FIG. 4A, the outer ring in the front motor bearing 66 is held by a protrusion 17C protruding rearward on the gear case 17. The protrusion 17C is annular or arc-shaped. The protrusion 17C is at least partially received in the front recess 111. The protrusion 17C overlaps the front recess 111 as viewed from outside in the circumferential direction. The protrusion 17C has its rear end (distal end) located rearward from the front end (opening) of the front recess 111. This shortens the rotor 61 and its peripheral components in the front-rear direction. In addition, the front motor bearing 66 can be easily supported more firmly.

An inner ring in the front motor bearing 66 has its rear end held by a front step on an outer curved surface of the motor shaft 62. The motor shaft 62 has a portion frontward from the front step with a smaller outer diameter than its portion rearward from the front step.

The rear recess 112 is located at the rear end of the magnet holder 100. The rear recess 112 is located on the rear surface of the magnet holder body 110 to surround the inner hole of the magnet holder body 110. The rear recess 112 is recessed frontward relative to its radially outer portion. The radially inner edge of the rear recess 112 extends to the inner hole (a portion adjacent to the motor shaft 62) of the magnet holder body 110. The rear recess 112 has its central axis extending in the front-rear direction and aligned with the central axis of the motor shaft 62.

The rear recess 112 has a larger outer diameter than the rear motor bearing 64. An outer ring in the rear motor bearing 64 is not in contact with the magnet holder 100 but is in contact with the rear lid 14.

The rear motor bearing 64 is at least partially received in the rear recess 112. The rear motor bearing 64 overlaps the rear recess 112 as viewed from outside in the circumferential direction. The rear motor bearing 64 has its front end located frontward from the rear end of the rear recess 112. This shortens the rotor 61 and its peripheral components in the front-rear direction.

As shown in FIG. 4A, the outer ring in the rear motor bearing 64 is held on the protrusion 14C protruding frontward on the rear lid 14. The protrusion 14C is annular or arc-shaped. The protrusion 14C is at least partially received in the rear recess 112. The protrusion 14C overlaps the rear recess 112 as viewed from outside in the circumferential direction. The protrusion 14C has its front end (distal end) located frontward from the rear end (opening) of the rear recess 112. This shortens the rotor 61 and its peripheral components in the front-rear direction.

The inner ring in the rear motor bearing 64 has its front end held by a rear step on the outer curved surface of the motor shaft 62. The motor shaft 62 has a portion frontward from the rear step with a larger outer diameter than its portion rearward from the rear step.

At least one of the front recess 111 or the rear recess 112 may be eliminated.

Figure 4B:
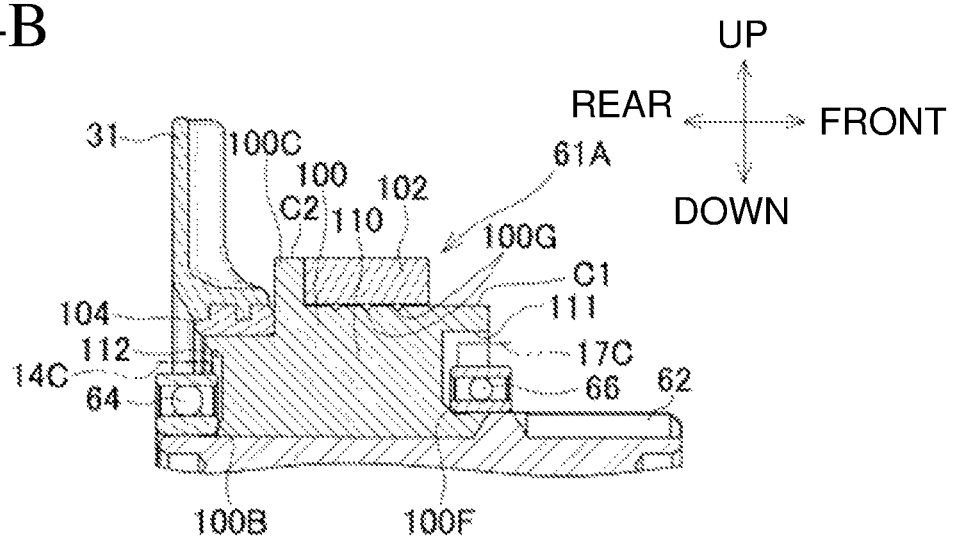
FIG. 4B is a longitudinal central sectional view corresponding to an upper half of FIG. 4A in a modification.

The magnet holder 100 may include at least one of a front inner ring holder 100F or a rear inner ring holder 100B instead of or in addition to the front step and the rear step on the motor shaft 62. In particular, the magnet holder 100 may include both the front inner ring holder 100F and the rear inner ring holder 100B in a rotor 61A as a modification of the rotor 61 as shown in FIG. 4B. The magnet holder 100 including the inner ring holders 100F and 100B is further shortened in the direction of the motor shaft 62 and also includes fewer components.

The front inner ring holder 100F is received in the front recess 111 on the front surface of the magnet holder body 110. The front inner ring holder 100F annularly protrudes frontward from the rear surface (bottom surface) of the front recess 111. The front inner ring holder 100F is in contact with the inner ring in the front motor bearing 66 from the rear to hold the inner ring. The front inner ring holder 100F holds the front motor bearing 66 more appropriately. The front inner ring holder 100F may hold the entire inner ring in the front motor bearing 66.

The rear inner ring holder 100B is received in the rear recess 112 on the rear surface of the magnet holder body 110. The rear inner ring holder 100B annularly protrudes rearward from the front surface (bottom surface) of the rear recess 112. The rear inner ring holder 100B is in contact with the inner ring in the rear motor bearing 64 from the front to hold the inner ring. The rear inner ring holder 100B holds the rear motor bearing 64 more appropriately. The rear inner ring holder 100B may hold the entire inner ring in the rear motor bearing 64.

The front inner ring holder 100F and the rear inner ring holder 100B may have shapes similar to each other or shapes different from each other. When the front inner ring holder 100F and the rear inner ring holder 100B have shapes similar to each other, the rotor 61 can be assembled more easily.

The magnet 102 is annular.

The magnet 102 is a permanent magnet. The magnet 102 has polar anisotropy. The magnet 102 has a total of four poles alternating in the circumferential direction (N-pole, S-pole, N-pole, and S-pole). The adjacent poles are different from each other. The magnetic flux between the adjacent poles passes in an arc through the magnet 102. Thus, the magnet holder 100 may not have magnetic permeability, and may be nonmagnetic. This facilitates adjustment of the rotational balance of the rotor 61.

The magnet 102 may have two, six, or more poles. The magnet holder 100 may be magnetic. The magnet 102 may have radial anisotropy. In this case, the magnet 102 can be combined with the magnet holder 100 (rotor core) that is magnetic to appropriately direct the magnetic flux. In addition, at least one of the magnet 102 or the magnet holder 100 is easier to prepare.

The magnet 102 is held on the magnet holder 100. The magnet 102 is located radially outward from the magnet holder 100. The magnet 102 has its center line aligned with the center axis of the motor shaft 62. The magnet holder 100 holds the magnet 102 with the magnet 102 exposed on the magnet holder 100 in the radial direction. The rotor 61 is used in a surface permanent magnet (SPM) motor.

The magnet 102 may be press-fitted onto the magnet holder 100 or bonded to the magnet holder 100. When the magnet 102 is bonded, at least one adhesive reservoir may be located on the outer surface of the magnet holder 100 to retain an adhesive. The adhesive reservoir is, for example, annular or arc-shaped grooves 100G that extend circumferentially as shown in FIG. 4B. The adhesive reservoir may be located on the inner surface of the magnet 102 instead of or in addition to the outer surface of the magnet holder 100. This allows the magnet 102 and the magnet holder 100 to be bonded easier and more firmly.

In addition to the magnet 102, a sensor magnet may be located to allow a sensor to determine the rotational state of the rotor 61. In this case, the sensor magnet may be held at the front end of the magnet holder 100.

The magnet 102 is shorter in the front-rear direction than the magnet holder 100.

The magnet 102 has its front end located rearward from the rear end of the front recess 111. A portion of the magnet holder 100 frontward from the front end of the magnet 102 is exposed by the magnet 102 to serve as a first machinable portion C1. The first machinable portion C1 is annular.

The magnet 102 has its rear end located frontward from the front end of the rear recess 112. A portion of the magnet holder 100 rearward from the rear end of the magnet 102 and frontward from the fan bushing 104 is exposed by the magnet 102 to serve as a second machinable portion C2. The second machinable portion C2 is annular.

A predetermined portion in at least one of the first machinable portion C1 or the second machinable portion C2 is cut with a blade (refer to arrow C in FIG. 4A) from outside in the radial direction. This adjusts the rotational balances of the magnet holder 100 and the rotor 61. The first machinable portion C1 may be cut in a manner other than those described above. For example, a blade may be applied from the front to the first machinable portion C1.

For more efficient balance adjustment, a material with a higher specific gravity may be used for the magnet holder 100. For less susceptibility to heat, the magnet holder 100 may be formed from a material with a thermal expansion coefficient closer to that of the magnet 102.

At least one of the first machinable portion C1 or the second machinable portion C2 may be eliminated. The magnet holder 100 may have a contact portion in contact with at least one of the front surface or the rear surface of the magnet 102 from outside in the axial direction (front-rear direction). The contact portion is, for example, a protrusion 100C that annularly protrudes outward in the circumferential direction relative to a portion frontward from the protrusion 100C on the circumferential surface of the rear end of the magnet holder body 110, as shown in FIG. 4B. In this case, the protrusion 100C is in contact with the magnet 102 from behind. In other words, the rear surface of the magnet 102 is in contact with the front surface of the protrusion 100C. This positions the magnet 102. The protrusion 100C can be cut from outside in the radial direction, and the balance of the rotor 61 is adjusted by cutting the predetermined portion of the circumferential surface of the protrusion 100C. The protrusion 100C may have a height less than the wall thickness of the magnet 102, a height that is the same as the wall thickness of the magnet 102, or a height more than the wall thickness of the magnet 102. The protrusion 100C and the second machinable portion C2 may be integral with each other. The protrusion 100C may be separate from other portions. The protrusion 100C may be located at the front end of the magnet holder body 110 instead of or in addition to at the rear end of the magnet holder body 110.

An operation example of the impact driver 1 will now be described.

The user holds the grip 6 and presses the button on the battery mount 40 or the upper operation unit 36 and the forward-reverse switch lever 46 as appropriate to select an intended impact mode and an intended rotation direction. In response to an operation on the trigger 56, the main switch 44 is turned on. The controller 42 then controls power from the battery 50 to be supplied to the motor 30 (at least one of the coils in the stator 60) to rotate the motor shaft 62 at a speed corresponding to the state of the signal from the switch body 54. This allows the motor 30 to be driven at a speed corresponding to the amount of the operation on the trigger 56. The rotation direction of the motor shaft 62 is determined based on the state of the forward-reverse switch lever 46.

The motor shaft 62 rotates to rotate the fan 31, forming an air flow (blow) with air flowing to the outlets 26. The blow flows mainly from the first inlets 24 to the outlets 26 or from the second inlets 25 to the outlets 26.

This cools the internal components of the impact driver 1, including the motor 30.

The rotational force of the motor shaft 62 is transmitted to the spindle 72 through the reduction in the planetary gear assembly 70. The rotational force of the spindle 72 is transmitted to the anvil 34 through the hammer 76.

When the anvil 34 receives torque with a predetermined threshold or greater, the spindle 72 guides the hammer 76 to vibrate (strike) back and forth by an amount corresponding to the impact mode setting. During striking, the spring 74 causes the hammer 76 to return under its elastic force upon every impact.

The first embodiment and the modification are not limited to those described above, and may be, for example, modified as appropriate as described below.

The reducer that reduces the rotation from the motor shaft 62 to the anvil 34 in the impact driver 1 may be replaced by a reducer other than the planetary gear assembly.

The impact driver 1 may include a power cable instead of the battery mount 40 to be driven by utility power (alternating current). At least one of the cases or housings may be formed from a material such as a resin, a metal, or a composite material of these materials. The housing 10 may be divided differently from the manner described above. In addition, for example, at least one of the number, material, arrangement, structure, or type of any components or portions may be modified as appropriate.

The first embodiment or the modification may be applied to, for example, a screwing machine without a striker, a screwing machine that is not handheld, other power tools, or other electric work machines. For example, the first embodiment or the modification is applicable to power tools such as angle drills, hammers, hammer drills, reciprocating saws, or grinders, garden tools such as chain saws, hedge trimmers, blowers, lawn mowers, grass cutters, or hedge clippers, cleaners, or air compressors for air tools driven by air. Electric machines for operating work machines, such as air compressors for air tools, are included in the electric work machines.

Second Embodiment

Figure 5:
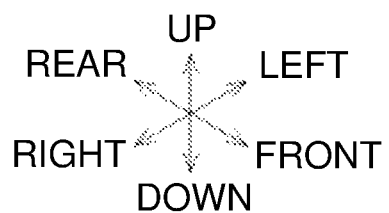
FIG. 5 is a perspective view of a rotor, a fan, a rear motor bearing, and a front motor bearing in a second embodiment.
Figure 5:
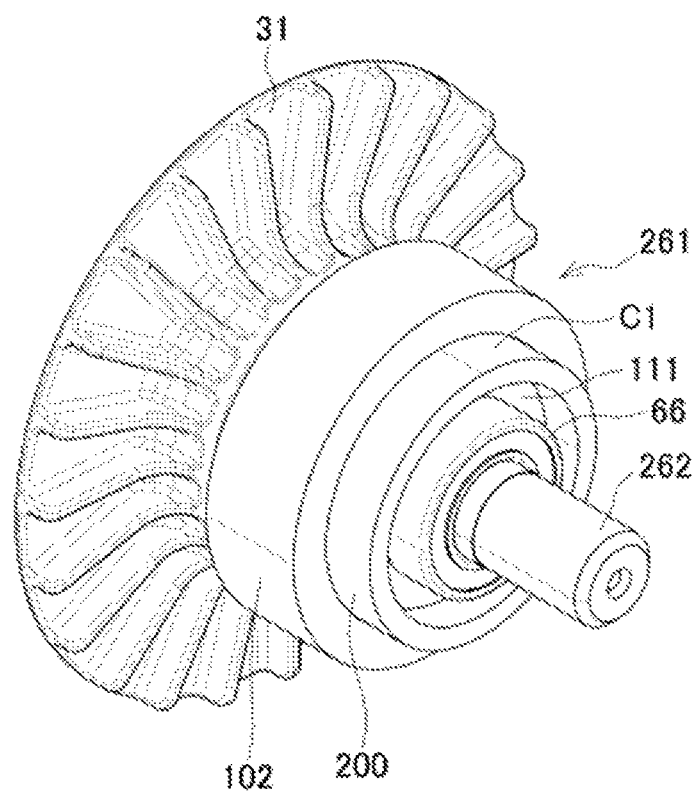
Figure 6:
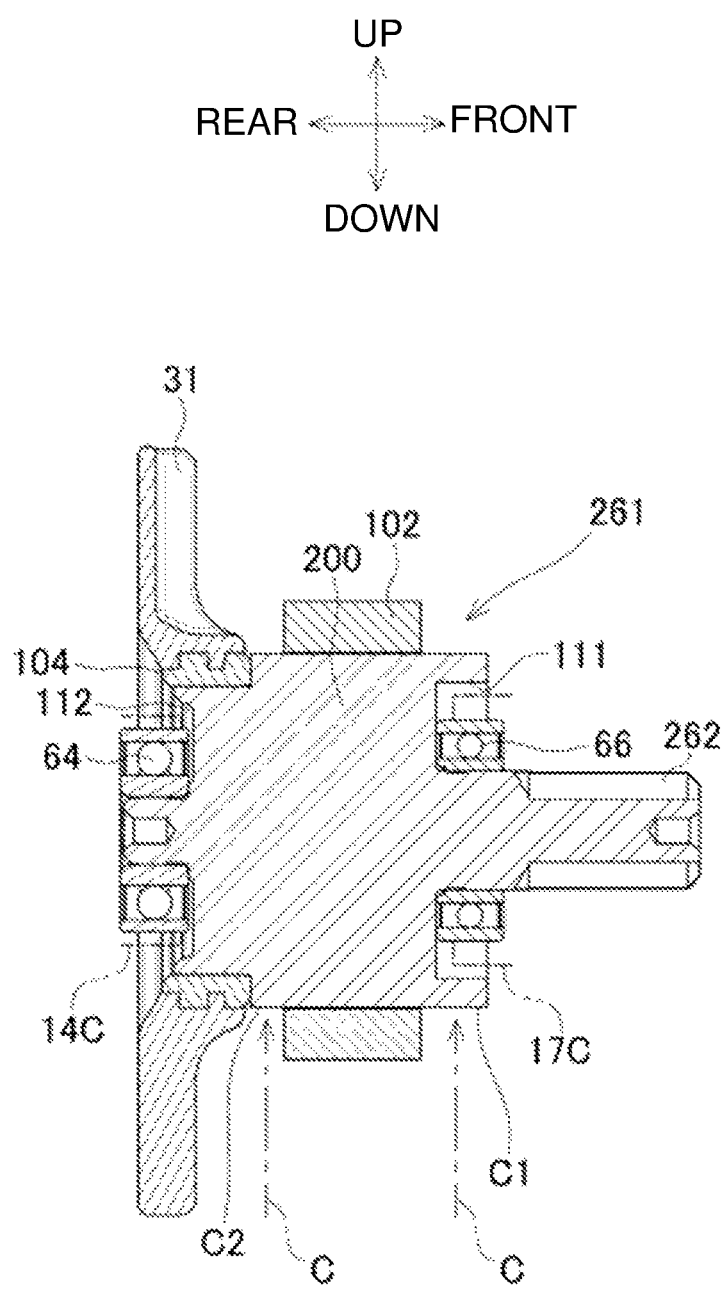
FIG. 6 is a longitudinal central sectional view of FIG. 5.

FIG. 5 is a perspective view of a rotor 261, the fan 31, the rear motor bearing 64, and the front motor bearing 66 in a second embodiment as viewed from the upper right front. FIG. 6 is a longitudinal central sectional view of FIG. 5.

The structure in the second embodiment is the same as in the first embodiment except the rotor. The components and portions that are the same as those in the first embodiment are given the same reference numerals, and will not be described.

The rotor 261 in the second embodiment includes a motor shaft 262 and the magnet 102.

The motor shaft 262 corresponds to the motor shaft 62 integral with the magnet holder 100 in the first embodiment.

In other words, the motor shaft 262 includes a magnet holder 200 from the middle to the rear in the front-rear direction. The magnet holder 200 is cylindrical. The motor shaft 262 including the magnet holder 200 may be nonmagnetic or magnetic. The magnet holder 200 integral with the motor shaft 262 may be a solid cylinder. The magnet holder 200 may be, for example, a regular polygonal prism.

The magnet holder 200 is integral with other portions of the motor shaft 262. This reduces the likelihood that the magnet holder 200 slides against or separates from the other portions of the motor shaft 262. This structure also includes fewer components.

The fan 31 is fixed to the rear end of the magnet holder 200 with the fan bushing 104.

The magnet holder 200 has the front recess 111 and the rear recess 112. The front motor bearing 66 is at least partially received in the front recess 111. The rear motor bearing 64 is at least partially received in the rear recess 112. This shortens the rotor 261 and its peripheral components in the front-rear direction.

The magnet 102 is held on the magnet holder 200 as in the first embodiment.

The magnet holder 200 includes the first machinable portion C1 and the second machinable portion C2.

The rotational balance of the rotor 261 is adjusted using at least one of the first machinable portion C1 or the second machinable portion C2.

The second embodiment may be appropriately modified as in the first embodiment.

Third Embodiment

Figure 7:
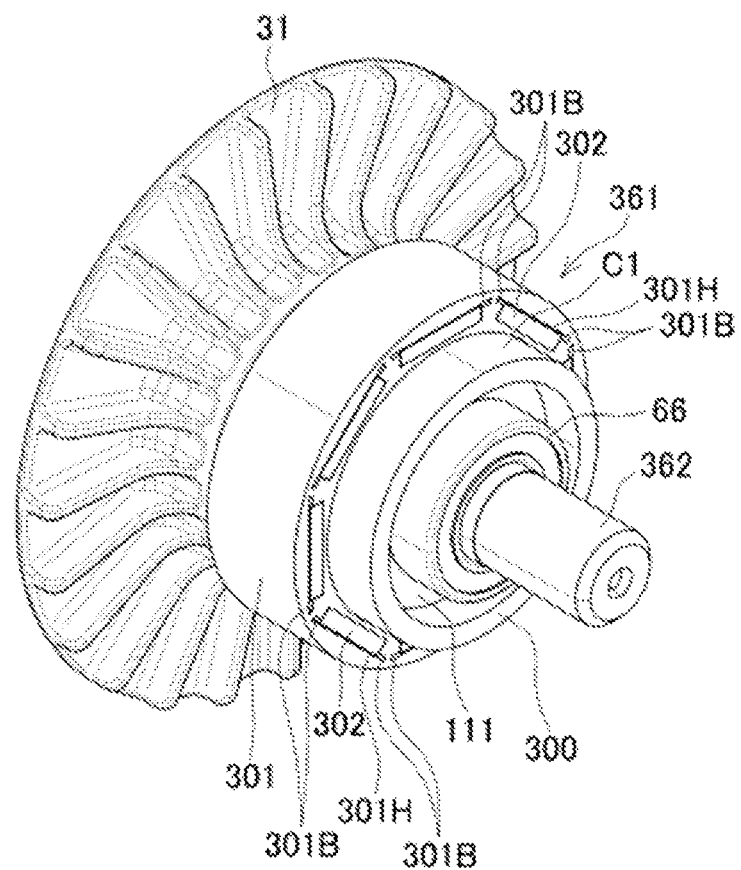
FIG. 7 is a perspective view of a rotor, a fan, a rear motor bearing, and a front motor bearing in a third embodiment.
Figure 8:
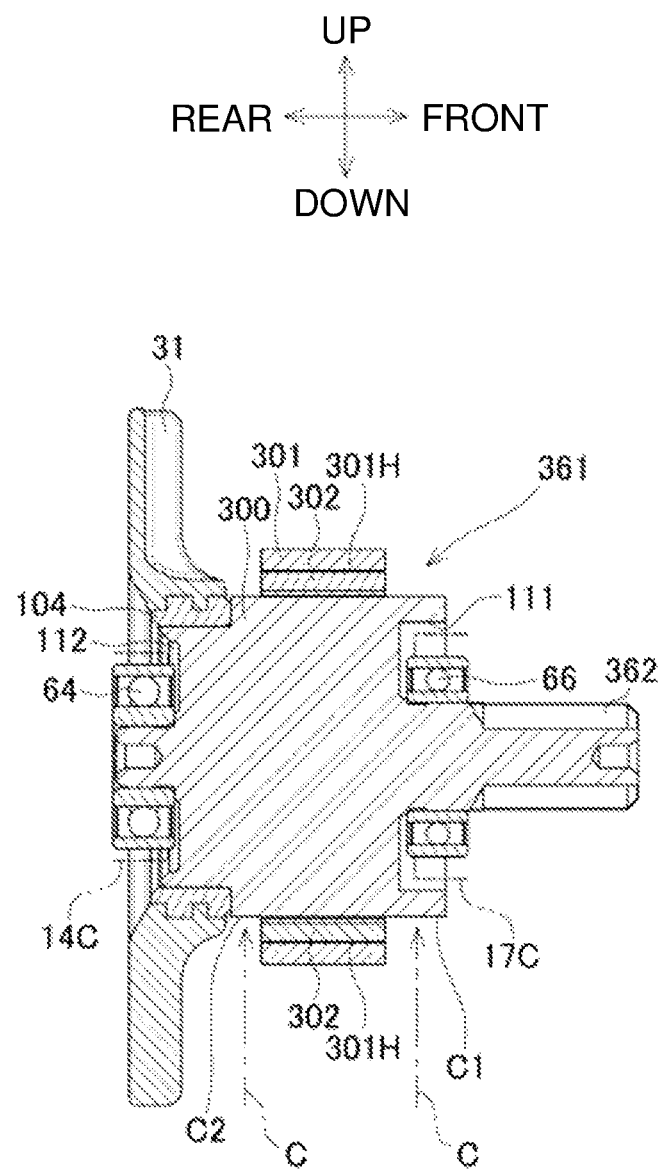
FIG. 8 is a longitudinal central sectional view of FIG. 7.

FIG. 7 is a perspective view of a rotor 361, the fan 31, the rear motor bearing 64, and the front motor bearing 66 in a third embodiment as viewed from the upper right front. FIG. 8 is a longitudinal central sectional view of FIG. 7.

The structure in the third embodiment is the same as in the second embodiment except the rotor. The components and portions that are the same as those in the second embodiment are given the same reference numerals, and will not be described.

The rotor 361 in the third embodiment includes a motor shaft 362, a magnet holder 301, and multiple (eight) magnets 302.

The motor shaft 362 includes a core holder 300. The core holder 300 is integral with the motor shaft 362. The core holder 300 has the same shape as the magnet holder 200 in the second embodiment.

The magnet holder 301 is held on the core holder 300. The magnet holder 301 is a part of the rotor 361. However, the magnet holder 301 is a component separate from the motor shaft 362 before the magnet holder 301 is fixed. The magnet holder 301 has the same shape, size, and arrangement as the magnet 102 in the first embodiment.

The core holder 300 in the third embodiment has the front recess 111 and the rear recess 112. The front motor bearing 66 is at least partially received in the front recess 111. The rear motor bearing 64 is at least partially received in the rear recess 112. This shortens the rotor 361 and its peripheral components in the front-rear direction.

The core holder 300 includes the first machinable portion C1 and the second machinable portion C2. Thus, the rotational balance of the rotor 361 is adjustable.

The core holder 300 may be separate from the motor shaft 362 as in the first embodiment. In other words, the core holder 300 in the third embodiment may have a shape similar to the motor shaft 62 and the magnet holder 100 in the first embodiment instead of the motor shaft 362 including the core holder 300.

The magnet holder 301 has multiple (eight) magnet holes 301H. Each magnet hole 301H is elongated in the front-rear direction.

The magnet hole 301H includes a flat slot with multiple (two) slits. The two slits are outward extensions of the flat slot in the circumferential direction.

The magnet holes 301H are located at equal intervals in the circumferential direction and extend along parts of the respective sides of a substantially regular octagon.

The magnet holder 301 includes multiple steel plates stacked on one another. Each steel plate extends vertically and laterally. The steel plates are stacked in the front-rear direction. Each steel plate includes a part of the corresponding magnet hole 301H. The steel plate is joined to the adjacent steel plate by crimping.

Each magnet 302 is a permanent magnet plate. The magnet 302 has a shape corresponding to the shape of the flat slot in the corresponding magnet hole 301H.

Each magnet 302 is placed in the corresponding magnet hole 301H. The magnet holder 301 holds the magnets 302 without exposing the magnets 302 in the radial direction. The core holder 300 indirectly holds the magnets 302 with the magnet holder 301.

The magnets 302 are embedded in the magnet holder 301 in the radial direction. Thus, the rotor 361 is used in an interior permanent magnet (IPM) motor. The magnet holder 301 of a magnetic material may be used to appropriately direct the magnetic flux of the magnets 302.

Each slit in the magnet hole 301H remains hollow after the magnet hole 301H receives the corresponding magnet 302, serving as a flux barrier 301B to reduce passage of the magnetic flux.

At least one of the magnet holder 301 or the magnets 302 may be other than those described above. For example, the magnet holder 301 may be a series of components integral with one another to be cylindrical. At least one of the magnets 302 or at least one of the flat slots in the magnet holes 301H may not be flat, and may be, for example, curved, bent, or barrel-shaped. At least one of the flux barriers 301B may be eliminated. At least one of the flux barriers 301B may be a semicircular cylindrical hole instead of or in addition to the slits. At least one of the flux barriers 301B may be located other than in a portion adjacent to a radially outward corner of the corresponding magnet hole 301H. Seven or fewer or nine or more magnet holders 301 and the magnets 302 may be located.

The third embodiment may be appropriately modified as in the first and second embodiments.

Fourth Embodiment

Figure 9:
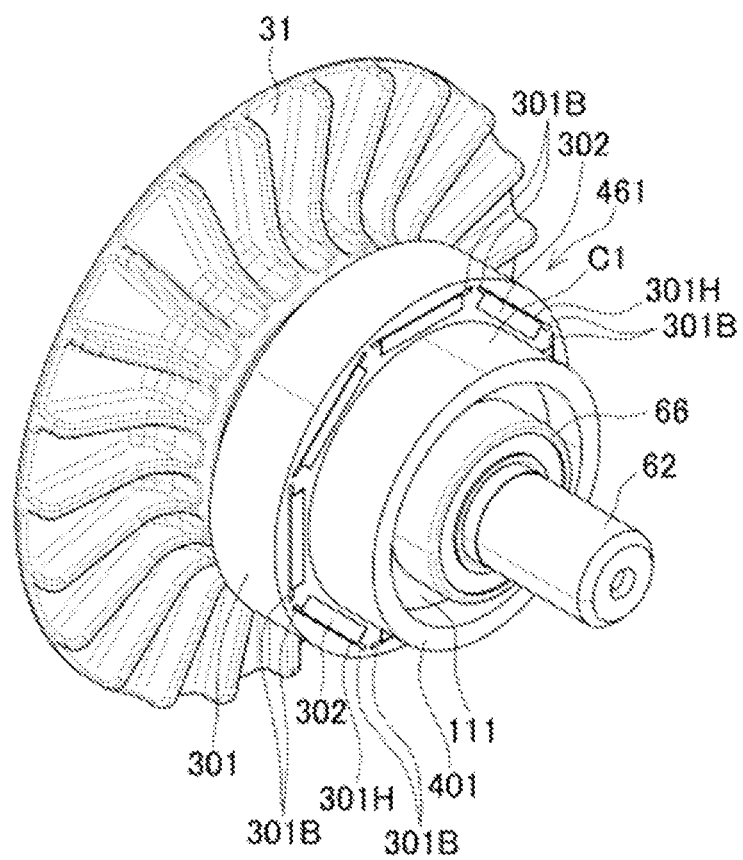
FIG. 9 is a perspective view of a rotor, a fan, a rear motor bearing, and a front motor bearing in a fourth embodiment.
Figure 10:
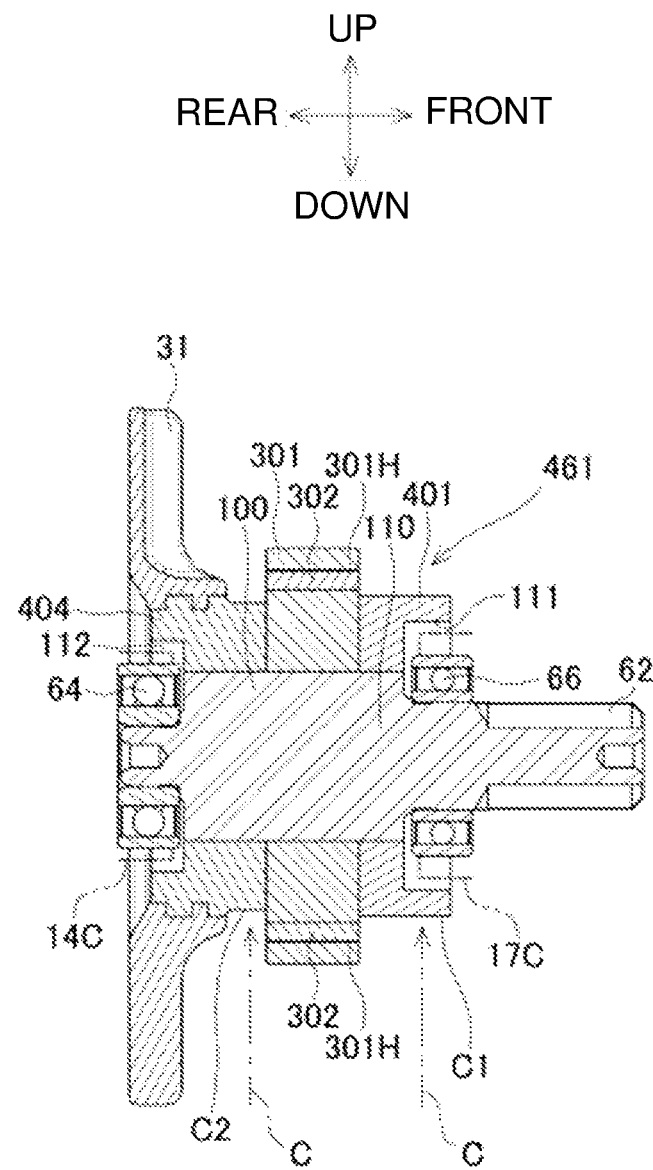
FIG. 10 is a longitudinal central sectional view of FIG. 9.

FIG. 9 is a perspective view of a rotor 461, the fan 31, the rear motor bearing 64, and the front motor bearing 66 in a fourth embodiment as viewed from the upper right front. FIG. 10 is a longitudinal central sectional view of FIG. 9.

The structure in the fourth embodiment is the same as the third embodiment except the rotor and the fan bushing. The components and portions that are the same as those in the third embodiment are given the same reference numerals, and will not be described.

The rotor 461 in the fourth embodiment includes the motor shaft 62 in the first embodiment, the magnet holder 301, multiple (eight) magnets 302, a front balance adjuster 401, and a rear balance adjuster 404.

The magnet holder 301 is held at the middle of the motor shaft 62 in the front-rear direction. Thus, the magnet holder 301 in the fourth embodiment includes a portion extending radially inward from the magnet holes 301H, unlike the structure in the third embodiment. Except this, the magnet holder 301 in the fourth embodiment is the same as the magnet holder 301 in the third embodiment.

The front balance adjuster 401 is formed from a metal (brass). The front balance adjuster 401 is cylindrical. At least one of the material or the shape of the front balance adjuster 401 may be replaced by another material or another shape, similarly to the magnet holder 100 in the first embodiment.

The front balance adjuster 401 is held at the middle of the motor shaft 62 in the front-rear direction. The front balance adjuster 401 is located on the front of the magnet holder 301. The front balance adjuster 401 is located radially outward from the motor shaft 62. The front balance adjuster 401 has its central axis aligned with the central axis of the motor shaft 62.

The front balance adjuster 401 has a shape corresponding to the shape of a portion frontward from the magnet 102 in the magnet holder 100 in the first embodiment. Thus, the front balance adjuster 401 has the front recess 111. The front motor bearing 66 at least partially received in the front recess 111 thus shortens the rotor 461 and its peripheral components in the front-rear direction.

The magnet holder 301 or other components are not located radially outward from the front balance adjuster 401, and the front balance adjuster 401 is exposed radially outward. Thus, the front balance adjuster 401 includes the first machinable portion C1. The rotational balance of the rotor 461 is adjustable by cutting the first machinable portion C1.

The rear balance adjuster 404 is formed from a metal (brass). The rear balance adjuster 404 is cylindrical. At least one of the material or the shape of the rear balance adjuster 404 may be replaced by another material or another shape, similarly to the magnet holder 100 in the first embodiment. At least one of the material or the shape of the front balance adjuster 401 and at least one of the material or the shape of the rear balance adjuster 404 may be different from each other.

The rear balance adjuster 404 is held at the rear of the motor shaft 62 in the front-rear direction. The rear balance adjuster 404 is located behind the magnet holder 301. The rear balance adjuster 404 is located radially outward from the motor shaft 62. The rear balance adjuster 404 has its central axis aligned with the central axis of the motor shaft 62.

The fan 31 is fixed to the rear of the rear balance adjuster 404. In other words, the rear balance adjuster 404 also serves as the fan bushing 104 in the first embodiment. This structure also includes fewer components.

The rear balance adjuster 404 has a shape corresponding to the shape combining a portion of the magnet holder 100 rearward from the magnet 102 and the fan bushing 104 in the first embodiment. Thus, the rear balance adjuster 404 has the rear recess 112. The rear motor bearing 64 at least partially received in the rear recess 112 thus shortens the rotor 461 and its peripheral components in the front-rear direction.

The magnet holder 301 and the fan 31 are not located radially outward from a front portion of the rear balance adjuster 404, and the front portion of the rear balance adjuster 404 is exposed radially outward. Thus, the rear balance adjuster 404 includes the second machinable portion C2 in its front portion. Thus, the rotational balance of the rotor 461 is adjustable also by cutting the second machinable portion C2.

At least one of the front balance adjuster 401 or the rear balance adjuster 404 may be eliminated when being integral with the magnet holder 301 or the motor shaft 62.

The fourth embodiment may be appropriately modified as in the first to third embodiments.

Fifth Embodiment

Figure 11:
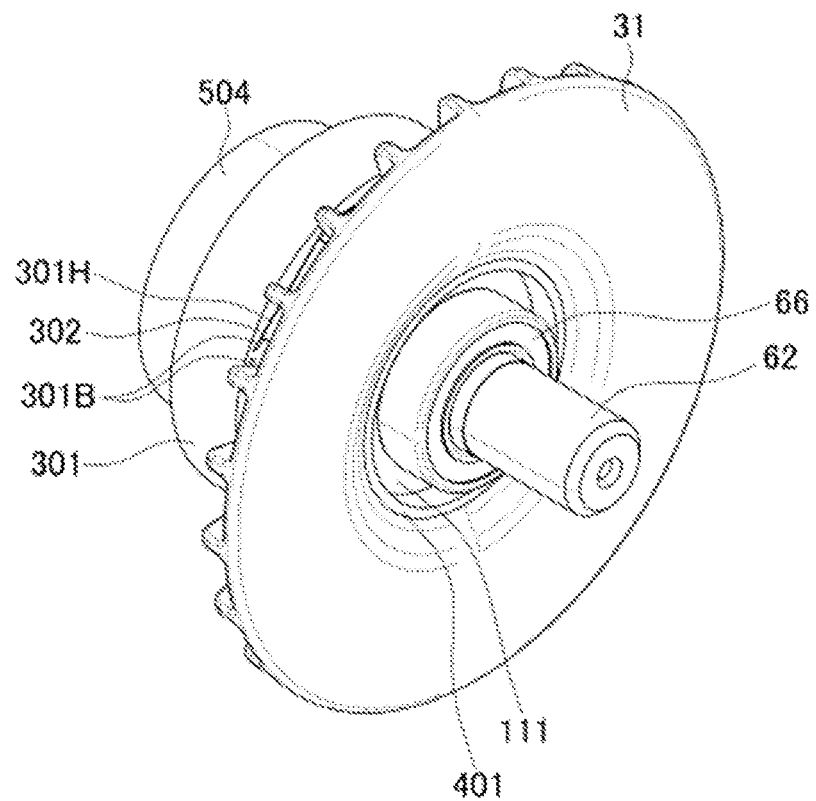
FIG. 11 is a perspective view of a rotor, a fan, a rear motor bearing, and a front motor bearing in a fifth embodiment.
Figure 12:
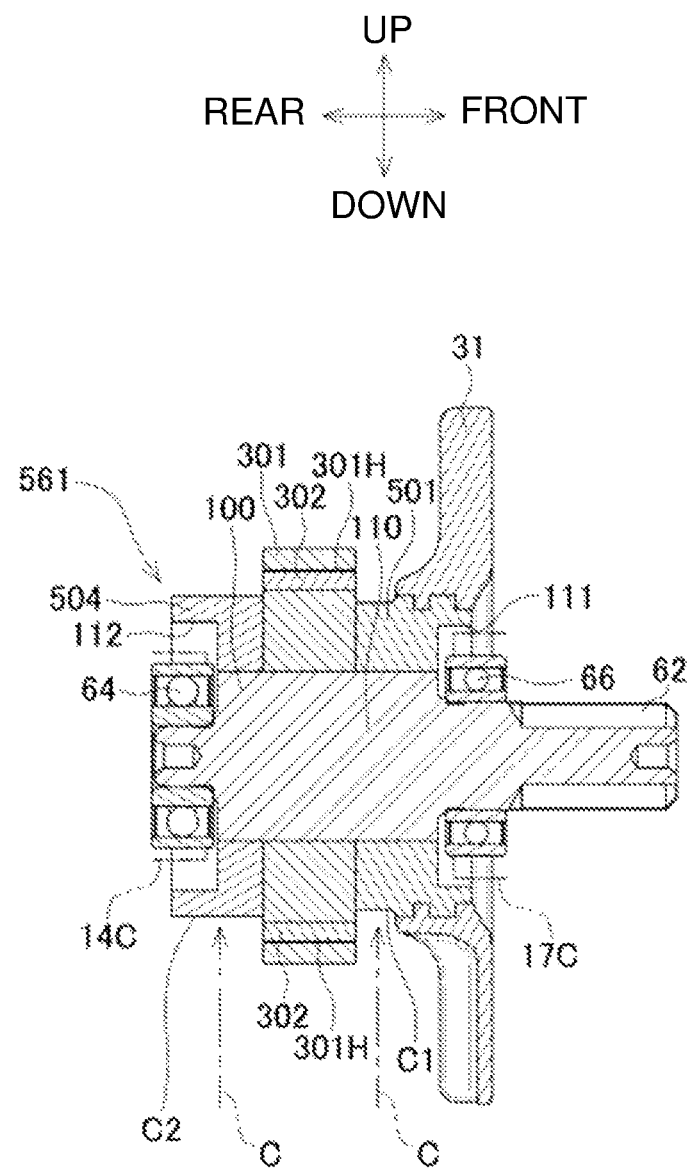
FIG. 12 is a longitudinal central sectional view of FIG. 11.

FIG. 11 is a perspective view of a rotor 561, the fan 31, the rear motor bearing 64, and the front motor bearing 66 in a fifth embodiment as viewed from the upper right front. FIG. 12 is a longitudinal central sectional view of FIG. 11.

The structure in the fifth embodiment is the same as in the fourth embodiment except the rotor, the fan, and the arrangement of a fixture for the fan. The components and portions that are the same as those in the fourth embodiment are given the same reference numerals, and will not be described.

The rotor 561 in the fifth embodiment includes the motor shaft 62 in the first embodiment, the magnet holder 301 and the multiple (eight) magnets 302 in the fourth embodiment, and a front balance adjuster 501 and a rear balance adjuster 504.

The front balance adjuster 501 has a shape corresponding to the shape of the front balance adjuster 401 in the fourth embodiment, additionally having, in its outer front portion, the shape of the fan bushing 104 inverted in the front-rear direction. The fan 31 is fixed to a front portion of the front balance adjuster 501 in a manner inverted in the front-rear direction from in the first embodiment. The front balance adjuster 501 also serves as the fan bushing 104 in the first embodiment. This structure also includes fewer components.

The front balance adjuster 501 has the front recess 111. The front motor bearing 66 at least partially received in the front recess 111 thus shortens the rotor 561 and its peripheral components in the front-rear direction.

The magnet holder 301 and the fan 31 are not located radially outward from a rear portion of the front balance adjuster 501, and the rear portion of the front balance adjuster 501 is exposed radially outward. Thus, the front balance adjuster 501 includes the first machinable portion C1 in its rear portion. The rotational balance of the rotor 561 is thus adjustable by cutting the first machinable portion C1.

The rear balance adjuster 504 has a shape corresponding to the shape of the rear balance adjuster 404 in the fourth embodiment from which the shape of the fan bushing 104 is eliminated. The fan 31 is not fixed to the rear balance adjuster 504.

The rear balance adjuster 504 has the rear recess 112. The rear motor bearing 64 at least partially received in the rear recess 112 thus shortens the rotor 561 and its peripheral components in the front-rear direction.

The magnet holder 301 or other components are not located radially outward from the rear balance adjuster 504, and the rear balance adjuster 504 is exposed radially outward. Thus, the rear balance adjuster 504 includes the second machinable portion C2. Thus, the rotational balance of the rotor 561 is adjustable by cutting the second machinable portion C2.

The front balance adjuster 501 and the rear balance adjuster 504 are located across the magnet holder 301 in the fourth embodiment in the axial direction (front-rear direction).

The fifth embodiment may be appropriately modified as in the first to fourth embodiments.

REFERENCE SIGNS LIST 1 impact driver (electric work machine)
14 lid (housing)
14C, 17C protrusion (portion of housing holding motor bearing)
17 gear case (housing)
31 fan
61, 261, 361, 461, 561 rotor
62 motor shaft
64 rear motor bearing
66 front motor bearing
100 magnet holder
100B rear inner ring holder
100C protrusion (contact portion)
100F front inner ring holder
100G groove (adhesive reservoir)
102 magnet (annular)
111 front recess (recess)
112 rear recess (recess)
200, 301 magnet holder
300 core holder
302 magnet (plate)
501 front balance adjuster (balance adjuster)
504 rear balance adjuster (balance adjuster)

What is claimed is:
1. An electric work machine, comprising:
a brushless motor including
a stator, and
a rotor including
a magnet that is cylindrical, and
a magnet holder that is hollow cylindrical or solid cylindrical, the magnet holder having a recess recessed in an axial direction, the magnet holder holding the magnet with the magnet being exposed in a radial direction, the magnet holder having an axial length longer than the magnet and being partially exposed; and
at least one motor bearing supporting the rotor in a rotatable manner, the at least one motor bearing being at least partially received in the recess,
wherein
the magnet holder includes an inner ring holder holding an inner ring in the at least one motor bearing, the at least one motor bearing includes two motor bearings located across the magnet holder in the axial direction, and the inner ring holder is located in each of the two motor bearings, and the inner ring holder in one of the two motor bearings and the inner ring holder in another of the two motor bearings have shapes similar to each other.

2. The electric work machine according to claim 1, wherein the magnet has polar anisotropy, and the magnet holder is nonmagnetic.

3. The electric work machine according to claim 1, wherein the magnet has radial anisotropy, and the magnet holder is magnetic.

4. The electric work machine according to claim 1, wherein the magnet holder has a radially outer surface partially exposed.

5. The electric work machine according to claim 1, wherein at least one of the magnet or the magnet holder includes an adhesive reservoir on a radially inner surface of the magnet or on a radially outer surface of the magnet holder.

6. The electric work machine according to claim 1, wherein the magnet holder includes a contact portion in contact with the magnet from outside in the axial direction.

7. An electric work machine, comprising:

a brushless motor including a stator, and a rotor including at least one balance adjuster that is cylindrical and has a recess recessed in an axial direction, the at least one balance adjuster being partially exposed;

a motor bearing supporting the rotor in a rotatable manner, the motor bearing being at least partially received in the recess; and a fan fixed to the at least one balance adjuster, wherein the rotor includes a plurality of magnets that are plates, a magnet holder that is cylindrical and holds the plurality of magnets without exposing the plurality of magnets in a radial direction, and a core holder that is hollow cylindrical or solid cylindrical, the core holder holding the magnet holder with the magnet holder exposed in the radial direction, and the at least one balance adjuster is located outward from the magnet holder in the axial direction.

8. The electric work machine according to claim 7, wherein the at least one balance adjuster has a radially outer surface partially exposed.

9. The electric work machine according to claim 7, wherein the at least one balance adjuster includes two balance adjusters located across the magnet holder in the axial direction.

10. The electric work machine according to claim 7, further comprising:

a housing holding the motor bearing, wherein the housing holding the motor bearing is at least partially received in the recess.

11. An electric work machine, comprising:

a brushless motor including a stator, and a rotor including a magnet that is cylindrical, and a magnet holder that is hollow cylindrical or solid cylindrical, the magnet holder having a first recess recessed in a first axial direction and a second recess recessed in a second axial direction opposite to the first axial direction, the magnet holder holding the magnet with the magnet being exposed in a radial direction, the magnet holder having an axial length longer than the magnet and being partially exposed; and a first motor bearing supporting the rotor in a rotatable manner, the first motor bearing being at least partially received in the first recess, the first motor bearing disposed at a different position in the first axial direction than the magnet, and a second motor bearing supporting the rotor in a rotatable manner, the second motor bearing being at least partially received in the second recess, the second motor bearing disposed at a different position in the second axial direction than the magnet.

12. The electric work machine according to claim 11, wherein the first recess is located at a different position in the first axial direction than the magnet, and the second recess is located at a different position in the second axial direction than the magnet.

* * * * *